United States Patent [19]

Cogdill

[11] Patent Number: 4,534,736

[45] Date of Patent: Aug. 13, 1985

[54] EDUCATIONAL TOY

[76] Inventor: Ben Cogdill, 2771 E. Christofferson Cir., Ogden, Utah 84403

[21] Appl. No.: 602,713

[22] Filed: Apr. 23, 1984

[51] Int. Cl.³ .................................................. G09B 1/20
[52] U.S. Cl. .................................... 434/403; 434/174; 446/489; 411/366
[58] Field of Search ............................ 254/98, DIG. 8; 434/174, 258, 260, 402, 403; 446/489; 411/366, 397

[56] References Cited

U.S. PATENT DOCUMENTS

| | | | |
|---|---|---|---|
| 668,663 | 2/1901 | Stillman | 254/98 |
| 935,258 | 9/1909 | Immer . | |
| 1,194,216 | 8/1916 | Morse | 434/403 X |
| 1,995,154 | 3/1935 | Morrison . | |
| 2,476,194 | 7/1949 | Hollowell . | |
| 2,485,280 | 10/1949 | Grace | 254/98 |
| 2,961,796 | 11/1960 | Davis | 446/489 X |
| 3,010,227 | 11/1961 | Glass | 434/174 |
| 3,302,311 | 2/1967 | Israel . | |
| 3,717,942 | 2/1973 | Presby . | |
| 4,146,978 | 4/1979 | Breslow | 434/174 |

Primary Examiner—Harland S. Skogquist

[57] ABSTRACT

An educational toy comprising a threaded shaft having blocks rigidly fixed to the opposite ends thereof and rotating and traveling blocks, spaced between the fixed end blocks and containing indicia to be aligned on faces of the rigidly fixed and rotating and traveling blocks.

3 Claims, 1 Drawing Figure

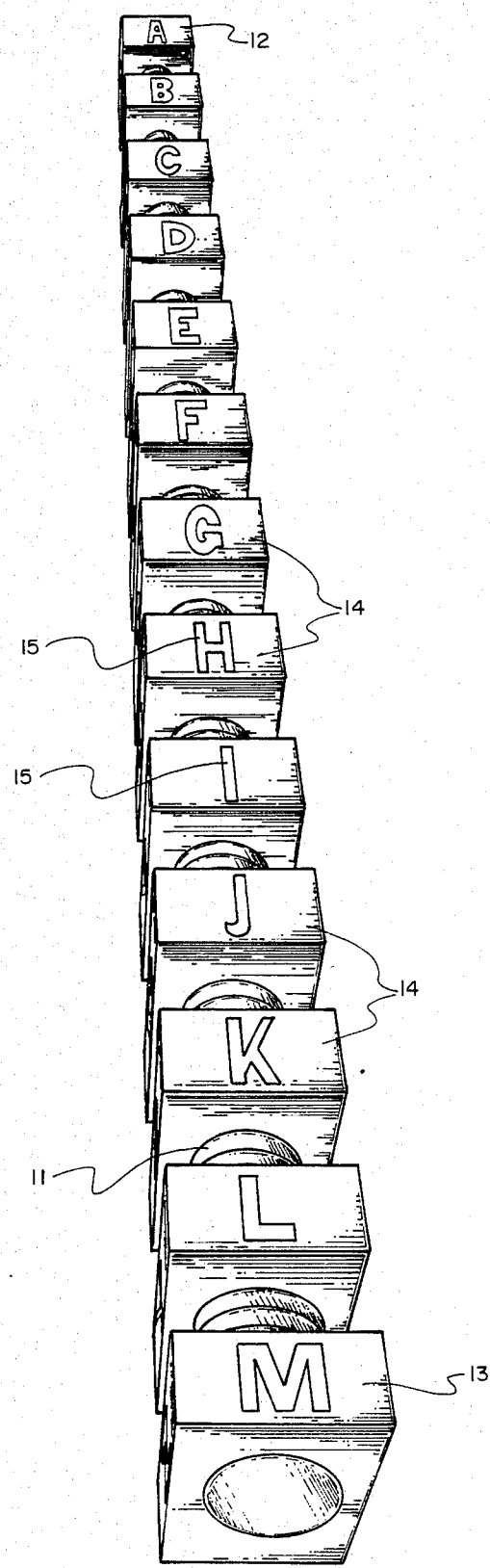

EDUCATIONAL TOY

FIELD OF THE INVENTION

This invention relates to educational toys for children and is particularly concerned with toys that provide for the positioning of block elements along a supporting shaft.

PRIOR ART

Toys incorporating block elements that rotate on shafts, have long been known. It has also been known to have indicia on the faces of the blocks so that adjacent blocks can be arranged in patterned indicia arrangements.

U.S. Pat. No. 935,258, discloses a toy having a series of parallel shafts, each having a plurality of multi-faced blocks positioned thereon. The blocks turn on the shafts, and may be arranged such that indicia on the faces of the shaft are placed in a desired pattern. Also, the device may be pulled along the ground with the blocks serving as wheels or rollers and with different indicia then becoming visible to a child pulling the toy.

U.S. Pat. No. 1,995,154 teaches the positioning of blocks having selected indicia on the faces thereof and with the blocks mounted for rotation on shafts. The shafts are positioned within a housing and are moved traversely to the length of the shafts in order to provide for individual rotation of the blocks to accomplish alignment of selected indicia.

U.S. Pat. No. 2,476,194 teaches an educational toy having a single shaft with a plurality of blocks mounted thereon and with the blocks held to the shaft by fixed handles. The blocks have selected indicia on the faces thereof and can be rotated on the shaft to arrange the indicia as desired. Similarly U.S. Pat. No. 3,717,942, shows a toy having a central shaft and plurality of blocks mounted for rotation about the shaft. The blocks are compressed by a spring so that inadvertent rotation will not occur.

OBJECTS OF THE INVENTION

Objects of the present invention are to provide an educational toy having a shaft with rotatable and traveling blocks thereon and with the block faces having indicia that can be aligned in any desired pattern as the blocks are rotated. The rotating and traveling blocks permit a child user to not only turn the blocks to provide a desired indicia arrangement, but also to position the blocks along the shaft in a desired spaced block pattern.

PRINCIPAL FEATURES OF THE INVENTION

Principal features of the invention include a threaded shaft having rigidly fixed blocks at opposite ends thereof and a plurality of rotatable and traveling blocks positioned on the shaft between the fixed blocks. The rotatable and traveling blocks are preferably dimensioned such that traveling space can be provided between each end block and its adjacent rotating and traveling block and the adjacent traveling blocks between the fixed end blocks.

Additional objects and features of the invention will become apparent from the following detailed description, drawings, and claims.

THE DRAWING

In the drawing:

The sole FIGURE of drawing is a perspective view of the educational toy of the invention taken from one end thereof.

DETAILED DESCRIPTION

Referring now to the drawing:

In the illustrated preferred embodiment, the educational toy of the invention, shown generally at 10, comprises a threaded shaft 11 having end blocks 12 and 13 immovably fixed to the opposite ends of the shaft.

A plurality of rotatable and traveling blocks 14 are positioned on the shaft 11, between the end blocks 12 and 13. As shown, the rotatable and traveling blocks are interiorly threaded to travel on the threaded shaft 11.

As illustrated, the end blocks 12 and 13 and the rotatable and traveling blocks 14 are made to have a square cross-sectional configuration thus providing four exterior surfaces on which indicia, such as the alphabetical letters shown at 15, are placed. It will be apparent that numbers, interrelated picture segments, color coding, or other generally known types of indicia could be used for the faces of the blocks 14. It is important that the distance between block 12 and block 13 be greater than the sum total of the thicknesses of block 14, so that the blocks 14 will be able to rotate on the shaft 11 and to travel therealong as they are rotated. It will be apparent that other cross-sectional configurations of blocks can be used, but the block faces should be matched so that the indicia thereon will properly align.

With the toy of the present invention, a child may align the indicia on the faces, as desired, and may also travel the blocks 14 along the shaft 11. Thus the child playing with the toy can, in addition to aligning indicia, as desired, also set the blocks 14 between the blocks 12 and 13 so that any desired equal spacing or pattern spacing between blocks can be obtained.

Although a preferred form of my invention has been herein disclosed, it is to be understood that the present disclosure is by way of example and that variations are possible without departing from the subject matter coming within the scope of the following claims, which subject matter I regard as my invention.

I claim:

1. An educational toy for use by children and the like, comprising a threaded shaft;

first block means rigidly affixed to one end of the threaded shaft; second block means rigidly fixed to the opposite end of the threaded shaft, said first and second block means having aligned faces; and a plurality of rotatable and traveling blocks, each being interiorly threaded to travel along the threaded shaft, spaced between the first and second rigidly fixed blocks, with the distance between the first and second rigidly fixed blocks being greater than the total thickness of the moveable blocks along the threaded shaft.

2. A toy as in claim 1, wherein the rotatable and traveling blocks each having faces corresponding to the faces of the rigidly attached blocks.

3. A toy as in claim 2, wherein the faces of the rigidly attached and rotatable traveling blocks each have indicia thereon, whereby proper face alignment of the blocks will provide a desired indica pattern.

* * * * *